United States Patent [19]

Huber et al.

[11] Patent Number: 5,981,646

[45] Date of Patent: Nov. 9, 1999

[54] PROTECTIVE COATING FOR TIRE SIDEWALLS AND METHOD FOR PROTECTING TIRE SIDEWALLS

[75] Inventors: Mortimer Joseph Huber, White Bear Lake, Minn.; Bharat Kanchanlal Kansupada; Fredrick Lewis Magnus, both of Mogadore, Ohio

[73] Assignees: The Goodyear Tire & Rubber Company; Quality Manufacturing Incorporated, both of Akron, Ohio

[21] Appl. No.: 09/038,374

[22] Filed: Mar. 11, 1998

Related U.S. Application Data

[62] Division of application No. 08/933,453, Sep. 18, 1997, Pat. No. 5,837,076
[60] Provisional application No. 60/026,984, Sep. 20, 1996.
[51] Int. Cl.[6] ............................... C08J 5/10; C08L 29/04
[52] U.S. Cl. .......................... 524/503; 524/501; 524/502; 524/506
[58] Field of Search ..................................... 524/501, 502, 524/503, 506

[56] References Cited

U.S. PATENT DOCUMENTS

| | | | |
|---|---|---|---|
| 4,780,225 | 10/1988 | Mowdood et al. | 252/28 |
| 4,889,677 | 12/1989 | Hashimoto et al. | 264/297.5 |
| 4,911,218 | 3/1990 | Patitsas | 152/525 |
| 4,967,819 | 11/1990 | Kansupada | 152/524 |
| 5,049,609 | 9/1991 | Patitsas | 524/386 |
| 5,385,975 | 1/1995 | Nakamura et al. | 525/101 |

*Primary Examiner*—Susan W. Berman
*Assistant Examiner*—U. K. Rajgurn
*Attorney, Agent, or Firm*—Alvin T Rockhill

[57] ABSTRACT

The invention relates to an aqueous polyvinyl alcohol/polyvinyl acetate-based composition which can be applied to a cured rubber surface, such as the white sidewall of a tire, to provide a protective coating against staining and scuffing. Preferably, the aqueous composition includes a polysiloxane agent for increasing the scuff resistance and high humidity resistance.

10 Claims, No Drawings

PROTECTIVE COATING FOR TIRE SIDEWALLS AND METHOD FOR PROTECTING TIRE SIDEWALLS

This is a divisional of Ser. No. 08/933,453 filed Sep. 18, 1997, now U.S. Pat. No. 5,837,076, which claims the benefit of United States Provisional Patent application Ser. No. 60/026,984, filed Sep. 20, 1996.

FIELD OF THE INVENTION

The present invention relates to a protective coating for tire sidewalls and method for protecting tire sidewalls.

BACKGROUND OF THE INVENTION

Tire sidewalls are often coated with protective paints or coatings, particularly tire sidewalls having a color which contrasts with the typical black-colored remainder of the tire. The general purpose of such a protective coating is to inhibit or prevent migration of chemicals to the tire rubber composition from the surface of an adjacent black-colored tire which would otherwise tend to stain and, thus, discolor the rubber. Staining caused by migration of chemicals upon contact from an adjacent tire usually becomes evident after exposure of the contacted rubber surface to ultraviolet light such as sunlight. Such contact staining phenomenon is well known.

Rubber tires are typically black in color due to the carbon black reinforcement contained therein. If a contrasting or other color is desired for a part of the tire, then a coloring pigment is used rather than the carbon black. Conventionally, various of the compounding ingredients used in the formulation of rubber for the manufacture of rubber products such as tires are of the staining type; namely, amine-based antidegradants and aromatic rubber processing oils. These chemicals tend to migrate to the surface of the rubber and may stain or discolor the rubber surface of another article which contacts it for a period of time, particularly after the contacted rubber is exposed to ultraviolet light.

Often, a polyvinyl alcohol (PVA) based coating is used to protect the contrastingly colored rubber surfaces from other rubber surfaces of the staining type because the polyvinyl alcohol itself tends to be a barrier for the migration of such staining material. Moreover, the PVA can normally be easily removed from the coated rubber surface, when and if desired, by simple water-washing, usually with a soap solution, since the PVA itself normally has a relatively high degree of water solubility, particularly when the water contains a surfactant. Thus, the PVA coat is typically used for storage and shipping conditions and is usually removed by water-washing by the user. The PVA coating is normally used in conjunction with (mixed with) a plasticizer so that the resulting PVA-based coating has a degree of flexibility.

Tires are often stored under varying circumstances for various purposes so that they may be in contact with each other for a period of time such as, for example, storage during their shipping or transportation to various locations and warehouse storing. The storage conditions can vary considerably and, sometimes, the tires are stored under relatively high humidity conditions and sometimes at elevated temperatures.

Under such circumstances, where the tire surface has a PVA-based coating thereon, it has been observed that under relatively high humidity conditions the PVA-based coatings soften and easily scuff or abrades away, particularly as one tire may rub against another during shipment, thereby leaving a portion of the contrastingly colored sidewall unprotected and susceptible to chemical contact migrating staining from other adjacent and contacting rubber products, including tires. At elevated temperatures, the aforesaid staining ingredients have a greater tendency to migrate to the surface of its host cured rubber product and, consequently, contribute to the staining of an adjacent and contacting rubber surface which is contrastingly light colored—even through many conventional protective barrier coatings (including PVA-based coatings).

Attempts have been made to provide a coating composition and a resultant coated rubber product, particularly a coated tire sidewall rubber surface, which will retard, inhibit and/or prevent the migration of amine-based antidegradants and aromatic rubber processing oils onto the rubber sidewall surfaces, such as a white sidewall, from an adjacent and contacting black rubber surface. For example, U.S. Pat. Nos. 5,137,070 and 5,240,056 to Kansupada et al describe protective coatings for the white sidewalls on tires based on polyvinyl alcohol, and including a monovalent water soluble salt of methylvinylether/maleic acid copolymer and a plasticizer. U.S. Pat. No. 4,911,218 to Patitsas describes a coating prepared from polyvinyl alcohol and mica or glass, and U.S. Pat. No. 5,149,591 to Patitsas et al describes a coating prepared from a blend of polyvinyl alcohol and water-dispersed polyurethane.

SUMMARY OF THE INVENTION

The invention is directed toward an aqueous polyvinyl alcohol/polyvinyl acetate-based composition for application to a cured rubber substrate; such as, the white sidewall of a tire in order to provide a coating for protection from staining and scuffing caused by antioxidants, antiozonants, amines and oils. The aqueous polyvinyl alcohol/polyvinyl acetate-based composition includes an aqueous mixture including polyvinyl alcohol and polyvinyl acetate in a solids weight ratio of between about 1:5 to about 1:2. In order to enhance the scuff resistance of the resulting coating, an anti-scuff agent can be added. In the case where the anti-scuff agent is a silicone emulsion, it is preferably used in an amount of about 2 to about 5 percent by weight based on the weight of the composition. The present invention more specifically discloses an aqueous polyvinyl alcohol/polyvinyl acetate-based composition comprising:

(a) an aqueous mixture including polyvinyl alcohol and polyvinyl acetate, wherein the weight ratio of polyvinyl alcohol to polyvinyl acetate is provided between about 15:85 to about 4:60;

(b) and an anti-scuff agent in an amount sufficient to provide increased scuff resistance for a coating prepared from the composition.

The invention is further directed to a pneumatic tire composed of cured rubber of which at least a portion of said cured rubber contains a pigment in the absence of carbon black wherein the surface of said portion has a coating thereon. The coating provides protection for the cured rubber from staining and scuffing caused by migration of chemicals; such as, antioxidants, antiozonants, amines and oils. The coating includes greater than about 15 percent by weight polyvinyl alcohol, greater than about 65 percent by weight polyvinyl acetate, greater than about 0.5 percent by weight plasticizer; and a sufficient amount of anti-scuff agent for increasing the scuff resistance of the coating. The present invention further discloses a pneumatic tire composed of cured rubber of which at least a portion of said cured rubber contains a pigment in the absence of carbon black wherein the surface of said portion has a coating thereon comprising: greater than about 15 percent by weight polyvinyl alcohol; greater than about 65 percent by weight polyvinyl acetate; greater than about 0.5 percent by weight plasticizer; and a sufficient amount of anti-scuff agent for increasing the scuff resistance of the coating.

The invention is further directed to a method for protecting the sidewall on a pneumatic tire from staining and scuffing. The method includes the step of applying to a pneumatic tire sidewall an aqueous composition including polyvinyl alcohol and polyvinyl acetate, wherein the weight ratio of polyvinyl alcohol to polyvinyl acetate is provided between about 1:5 to about 1:2; and an anti-scuff agent in an amount sufficient to provide increased scuff resistance for a coating prepared from the composition. A preferred method of applying the aqueous composition to the sidewall includes spraying. In the case of applying the aqueous composition by spraying, it is preferred that the aqueous composition has a solids content of between about 25 and about 50 percent by weight. Once the composition is applied, it is allowed to dry and can be subsequently removed by washing with water. The present invention also specifically reveals a method for protecting the sidewall on a pneumatic tire from staining and scuffing, said method comprising applying to a pneumatic tire sidewall an aqueous composition including polyvinyl alcohol and polyvinyl acetate, wherein the weight ratio of polyvinyl alcohol to polyvinyl acetate is provided between about 15:85 to about 40:60; and an anti-scuff agent in an amount sufficient to provide increased scuff resistance for a coating prepared from the composition.

DETAILED DESCRIPTION OF THE INVENTION

The present invention relates to an aqueous polyvinyl alcohol/polyvinyl acetate-based composition which can be applied to a cured rubber surface, such as the white sidewall of a tire, to provide a protective coating against staining and scuffing. The polyvinyl alcohol/polyvinyl acetate-based composition can be referred to as an aqueous composition or a paint, or more simply as "the composition." Once it is applied to a substrate and cured and/or dried, it can be referred to as a protective coating or more simply as "the coating." It should be understood that, while the phrase "the coating" is intended to refer to the dried state, it need not exclude moisture completely. That is, it is meant to include moisture as a result of atmospheric humidity.

In the context of the present invention, the polyvinyl alcohol/polyvinyl acetate-based composition refers to a composition containing substantial amounts of polyvinyl alcohol, polyvinyl acetate and anti-scuff agent to provide resistance to staining and scuffing at low and high humidity. The composition includes sufficient amounts of polyvinyl alcohol, polyvinyl acetate and plasticizer to provide barrier properties to staining and flexibility and low humidity resistance. Generally, this corresponds to an amount of polyvinyl alcohol of at least about 15 percent by weight, based on solids weight, and an amount of polyvinyl acetate of at least 65 percent by weight, based on solids weight. It is important that the coating possesses sufficient flexibility so that significant cracking does not occur when the coating is placed on the sidewall of a pneumatic tire. Significant cracking allows staining chemicals to penetrate the coating and cause staining. Low humidity resistance is particularly important during the winter months when the relative humidity is so low. Thus, at relative humidity levels of about 13 percent, the coating should not significantly crack. It is a discovery of the invention that the ratio of polyvinyl alcohol to polyvinyl acetate can be adjusted to increase the flexibility and the low humidity resistance of the coating. In order to provide desired flexibility and low humidity resistance, the weight ratio of polyvinyl alcohol to polyvinyl acetate can be between about 1:5 to about 1:2.

It is a further discovery that the scuff resistance and high humidity resistance can be improved by the addition of an anti-scuff agent. High humidity resistance is important, particularly during the summer months when increased humidity tends to soften prior art polyvinyl alcohol-based coatings. Scuff resistance is important so that the coating does not easily abrade away which would result in exposure of the rubber surface to staining chemicals. As explained in more detail below, the aqueous composition according to the invention can include additional components; such as, surfactants, plasticizers, biocides and the like.

As will be apparent from an understanding of the invention, the composition can be applied by spraying or brushing, or by any other mechanism normally associated with the application of paints. Once the composition is applied, the water present therein is allowed to evaporate which causes the composition to dry and form a protective coating. According to the invention, the coating can be removed by application of a water wash. Typically, when the composition is applied to the white sidewall of a pneumatic tire, the dried coating is removed with warm water once the tires are mounted on a vehicle.

The Polyvinyl Alcohol/Polyvinyl Acetate Component

The aqueous composition of the invention includes a major component which can be referred to as the "polyvinyl alcohol/polyvinyl acetate component." This component includes substantial amounts of both polyvinyl alcohol and polyvinyl acetate and can be plasticized to increase the flexibility of the resulting coating.

The polyvinyl alcohol component of the aqueous composition of the present invention is generally provided in a sufficient amount to provide a coating having barrier properties to chemicals that might stain the sidewall; such as, amines, oils, antioxidants, antiozonants and the like. This usually corresponds to an amount of polyvinyl alcohol in the composition of between about 20 to about 30 percent by weight, and more preferably between about 23 to about 28 percent by weight, based on the dry weight of the composition.

The polyvinyl alcohol component generally has the repeating structure —$CH_2CHOH$—. Polyvinyl alcohol is commercially available and is well known to the art and literature, and is typically made by the alcoholysis of polyvinyl acetate (PVAC) which generally has the repeating structure —$CH_2CH(COOCH_3)$—. For purposes of the invention, the polyvinyl alcohol component should have a weight average molecular weight which is within the range of about 22,000 to about 250,000, depending on the grade of the polymer. It is generally recognized that, as the molecular weight decreases, the water solubility increases. Thus, the preferred weight average molecular weight range is from about 84,000 to about 110,000 to ensure adequate solubility, and the preferred number average molecular weight is in the range of about 22,000 to about 50,000. It should be understood that, by lowering the molecular weight of the polyvinyl alcohol component, increased flexibility or pliability in the coating can be achieved.

It should be understood that, because polyvinyl alcohol is often prepared by alcoholysis of polyvinyl acetate, commercially available polyvinyl alcohol often contains residual amounts of polyvinyl acetate. In commercially available polyvinyl alcohol, it is believed that the polyvinyl acetate content may range between 0.5 and 20 percent by weight based on the dry weight. This residual polyvinyl acetate is present in significantly lower amounts than required by the aqueous coating composition of the invention. Exemplary sources of polyvinyl alcohol which can be used in the invention are described in U.S. Pat. Nos. 5,137,070 and 5,240,056 to Kansupada et al, the disclosures of which are incorporated by reference in their entirety. A preferred polyvinyl alcohol composition is available from the H.B. Fuller Company as WD3806.

According to the invention, polyvinyl acetate is provided in the-composition to provide improved flexibility and humidity resistance for the coating. The polyvinyl acetate is a water-dispersible molecule that is provided in a sufficient amount to increase adhesion between the composition and the rubber tire sidewall. This usually corresponds with an amount of polyvinyl acetate in the range of about 70 to about 80 percent by weight, based on the solids weight, and more preferably about 73 to about 78 percent by weight, based on the solids weight.

Polyvinyl acetate is commercially available and is generally formed by the polymerization of vinyl acetate with a peroxide catalyst. Exemplary sources of polyvinyl acetate are described in U.S. Pat. No. 3,114,650 to Oppenheim et al, the disclosure of which is incorporated by reference in its entirety. A preferred polyvinyl acetate composition (including up to 3 percent plasticizer) is available from the H.B. Fuller Company as XR5832HS.

The ratio of polyvinyl alcohol to polyvinyl acetate in the composition of the invention can vary depending on the properties desired to achieve. For example, as the amount of polyvinyl alcohol in the emulsion is increased, the composition has increased stain resistance but decreased scuff resistance, particularly under conditions of high humidity. In contrast, as the amount of polyvinyl acetate in the emulsion is increased, the composition provides increased humidity resistance. Additionally, if too much polyvinyl acetate is added to the composition, the composition may become too difficult to remove from rubber tires.

In order to provide desired properties of adhesiveness, stain resistance, scuff resistance and humidity resistance, it is preferred that the composition contains a dry weight ratio of polyvinyl alcohol to polyvinyl acetate of from about 15:85 (respectively) to about 40:60 (respectively). Preferably, the polyvinyl alcohol and polyvinyl acetate are present in a weight ratio of between about 20:80 (respectively) to about 30:70 (respectively).

The polyvinyl alcohol/polyvinyl acetate composition of the invention preferably includes a plasticizer to provide increased flexibility of the coating. Preferably, the plasticizer does not adversely effect or degrade the barrier properties of the protective coating composition, at least not substantially. When a plasticizer is used, it is preferably used in an amount of between about 0.5 and about 5 percent by weight, based on the solids weight, and more preferably between about 1 and about 3 percent by weight, based on the solids weight. An exemplary plasticizer which can be used includes glycerin or polyglycerol.

The weight percentage of the composition attributable to polyvinyl alcohol polymer and polyvinyl acetate polymer (referred to herein as the solids PVA/PVAC/plasticizer content) can be adjusted to provide desired flow properties. When the composition is to be applied by spray application, for example, it preferably has a solids content of between about 25 percent by weight to about 50 percent by weight, and more preferably between about 30 percent by weight to about 40 percent by weight, based on the total weight of the composition. It is particularly preferred that the solids PVA/PVAC/plasticizer content is about 36 percent by weight for spray application. One skilled in the art would readily appreciate how the solids content of the composition can be adjusted for various applications.

The Anti-Scuff Agent

It is a discovery of the invention that, while a composition containing desired amounts of polyvinyl alcohol and polyvinyl acetate can provide increased anti-staining properties and desirable adhesion to a cured rubber surface, the scuff resistance and high humidity resistance can be improved by the incorporation of an anti-scuff agent. Preferred anti-scuff agents are silicones or polysiloxane such as polydimethyl siloxane. A family of silicones is available from GE Silicones (General Electric Company, Waterford, N.Y.) and can be referred to as mold release agents and general purpose release agents because of their good lubricity. It is a discovery of the invention that these mold release agents can be used to enhance scuff resistance while retaining the desired properties of adhesiveness. Preferably, the scuff resistance of the coating can be improved by at least three times, and more preferably by at least six times. It should be appreciated that this increase in scuff resistance can be measured according to the procedure described in Example 2.

When the anti-scuff agent is a silicone emulsion, it has been found that it can be used at a concentration of 2 to 5 percent by weight, and more preferably 3 to 4 percent by weight, based on the total weight of the composition. It should be appreciated that the silicone emulsion provided in the above range is a water-based emulsion containing between 50 and 60 percent solids. Thus, the amount of silicone emulsion can be adjusted based on the solids content of the emulsion. Exemplary GE Silicone emulsions useful in the invention are available under the names SM2140, SM2163 and SM2164. These are silicone emulsions based on polydimethyl siloxane having a range of less than about 20,000 Centistokes. More preferably, the range can be provided between about 200 and about 1,000 Centistokes and between about 8,000 and about 12,000 Centistokes.

Another advantage of the polyvinyl alcohol/polyvinyl acetate composition of the invention is that it can adhere evenly to a cured rubber tire sidewall even though the tire sidewalls contains residual lubricant remaining from tire processing. It should be appreciated that adhering evenly means that the composition provides an even coating without craters.

It is a discovery of the present invention that polysiloxanes reduce the scuffing of the protective coating. While not desiring to be bound by theory, it is believed that it rises to the surface of the coating as the coating dries. Consequently, the protective coating has an oily surface and is therefore less likely to grab onto a neighboring tire that comes in contact with the coating. Accordingly, it should be appreciated that any similarly functioning component can be characterized as an anti-scuff agent. One is cautioned from adding too much polysiloxane. Because polysiloxanes are often used as a lubricant, it is expected that too high a concentration will deteriorate the coating adhesiveness.

It should additionally be appreciated that the anti-scuff agents of the present invention provide improved scuff resistance even under conditions of high humidity. In the case of polysiloxane anti-scuff agents, this feature is believed to be the result of a barrier to water being provided to isolate the hygroscopic polyvinyl alcohol from humidity. While it is desirable to provide a sufficient amount of anti-scuff agent to provide the above-mentioned desirable properties, it is believed that too much anti-scuff agent can impair stain resistance.

Other Components of the Composition

The composition of the invention can also contain a surfactant to enhance compatibility of the coating with a tire surface. It is understood that the surfactant decreases the surface tension of the aqueous composition so that the composition will not form craters if a contaminant, such as residual lubricant from tire processing, is present on the sidewall. In this context, it can also be referred to as a wetting agent. In addition to enhancing application of the composition to the surface of the tire, a surfactant improves the sprayability of the coating composition. In addition, the surfactant can be provided to reduce foaming. Exemplary surfactants which can be used include anionic surfactants, cationic surfactants, nonionic surfactants and mixtures thereof. It should be appreciated that nonionic surfactants are preferred because they generally provide better stability of the composition. Surfactants which cause foaming are not desired because they may tend to leave imperfections in the resulting coating because they provide poor coverage.

An additional requirement of the surfactant and of all components of the protective coating composition generally is that they do not stain the white sidewalls. A particularly preferred class of surfactant is an acetylenic diols, such as SURFYNOL 504 (ethoxylated tetramethyl decynediol), available from Air Products & Chemicals, Inc. of Allentown, Pa. While the amount of surfactant added to the protective coating composition can vary depending on the specific surfactant used, in most situations, it is believed that the composition should contain from about 0.1 percent by weight to about 1.0 percent by weight, and preferably from about 0.4 percent by weight to about 1.0 percent by weight surfactant, based on the total weight of the composition.

The composition may also include a thickening agent to adjust the rheology. The composition should have a rheology such that the composition will adhere to the rubber substrate without running. An exemplary thickening agent is Xanthan Gum (polysaccharide B-1459). The composition may further include a pigment such as white or blue pigments such as titanium dioxide, zinc oxide or phthalocyan. An examplary blue pigment is available as Tricosol Blue No 17732 from Tricon Colors, Inc. To prevent the transportation of microbes along with the tires, the composition may further contain a biocide to prevent the growth of fungus or bacteria on the coating. A preferred biocide is a broad spectrum fungicide; such as, 3-iodo-2-propyl butyl carbamate which is available from Troy Corp. of East Hanover, N.J., under the name POLYPHASE AF1. Other water-based fungicides which are known in the art can be used.

It should be appreciated that the pH of the composition is preferably adjusted so that it is sufficiently neutral so as to reduce injury if contacted with human flesh. Accordingly, it is preferred that the pH of the composition is provided between about 3 and about 10, more preferably between about 5 and about 8.

Preferred formulations of the protective coating composition are provided in Table 1 where the weight percentages are based on the total weight of the composition.

TABLE 1

Protective Coating Composition

| Component | Preferred (wt %) | Most Preferred (wt %) |
| --- | --- | --- |
| PVA/PVAC/plasticizer solids | 20–50 | 30–40 |
| anti-scuff agent | 2–6 | 3–5 |
| pigment | 0.01–0.1 | 0.01–0.05 |
| biocide | 0.1–1.0 | 0.1–0.5 |
| thickening agent | 0.1–0.5 | 0.1–0.2 |
| surfactant | 0.1–1.0 | 0.1–0.5 |
| water | balance | balance |

A preferred method of applying the composition to a substrate, such as a rubber tire sidewall, is by spraying, although other application methods could also be used including brushing, roll coating and the like. It should be appreciated, therefore, that the viscosity of the composition should be within a range sufficient to provide desired sprayability when spray application of the composition is desired. If the viscosity of the protective coating is too high, it becomes difficult to apply the composition by spraying. On the other hand, if the viscosity of the protective coating is too low, it may not uniformly coat the rubber substrate properly. In addition, the rubber surface for coating can contain various pigments for providing a color contrast with the black tire sidewall. A preferred pigment for white sidewalls is titanium dioxide. It should be appreciated that the composition can be applied to white sidewalls (WSW), color sidewalls and raised WSW letters.

Certain properties of the coating of the invention are related to the percent solids present in the composition. As the percent solids in the composition is increased, the coating dries faster. If the percent solids in the composition is too high, it may be difficult to apply by spray application and, once applied, it may not form a film having the desired thickness.

The advantages of this invention are more particularly shown by the following examples in which the parts and percentages are by weight unless otherwise indicated. It should be understood that the following examples further illustrate, but do not limit, the invention.

EXAMPLES

The following examples were provided to determine the properties of an aqueous polyvinyl alcohol/polyvinyl acetate (PVA/PVAC) composition containing the various additives identified.

Example 1

An aqueous polyvinyl alcohol/polyvinyl acetate (PVA/PVAC) based composition was formulated by the procedure described below. The amount of each component provided in the PVA/PVAC-based composition of this example is identified in Table 2. The PVA/PVAC emulsion indicated in Table 2 is 25:75 mixture of 25 parts polyvinyl alcohol available as WD3806 from the H.B. Fuller Company and 75 parts polyvinyl acetate available as XR5832HS from the H.B. Fuller Company. It is understood that the polyvinyl acetate component includes up to 3 percent by weight plasticizer.

TABLE 2

PVA/PVAC Based Composition

| ingredient | amount (grams) |
| --- | --- |
| water | 120 |
| thickening agent (Xanthan Gum) | 0.6–0.8 |
| PVA/PVAC emulsion (25:75) and plasticizer | 225 |
| pigment (phthalocyan blue) | 0.1 |
| biocide (POLYPHASE AF1) | 1.7 |
| surfactant (SURFYNOL 504) | 1.5 |

To prepare the composition, a latex masterbatch was prepared containing a 25 weight-percent polyvinyl alcohol and 75 weight-percent polyvinyl acetate emulsion with 1–3 weight-percent plasticizer. A blue pigment was added to the latex masterbatch and mixed for 10 minutes. Then a biocide was added and mixed for 15 minutes. A Xanthan Gum masterbatch was prepared by combining the water and Xanthan Gum. The water was first added to a beaker. Under sufficient agitation to form a vortex, the Xanthan Gum was then added slowly and mixed for 10 minutes. The Xanthan Gum masterbatch was then added to the latex masterbatch and mixed for 20 minutes. After this mixing step, the surfactant was added and mixed for 10 minutes, avoiding excessive agitation.

A 6-mil film of the composition was applied to a mylar substrate. After the composition was dried at 60° C., the scuff resistance of the coating was tested by rubbing the film with a block made from a tire tread. After each rub, the coating was examined for damage such as holes, peeling of the coating, wrinkles and the like. The coating of this example was able to withstand six rubs until damage was detected.

Example 2

Three aqueous compositions were prepared as described in Example 1. These compositions are identified as samples (a)–(c). Sample (a) was prepared by adding 10 grams lecithin followed by mixing; and sample (b) was prepared by adding 15 grams of siloxane emulsion available from the General Electric Company as SM-2140. Sample (c) contains no additional additive. The test results are described in Table 3.

TABLE 3

| | Samples | | | |
|---|---|---|---|---|
| Properties | (a) | (b) | (c) | |
| Size | 10 gallon | 10 gallon | 20 gallon | |
| Ease of Spraying | OK | OK | OK | |
| Throughput, g./min. | 22 | 22 | NA | |
| Appearance | Good | Excellent | Marginal | |
| Drying Time, min 6 wet mils, @ 60° C. | 5 | 5 | 5 | |
| Brookfield Vis., cps Spindle # 3 at | | | | Method QA-9 Model Brookfield RV # 6 |
| 0.5 rpm | 13400 | 10000 | 1600 | |
| 1.0 rpm | 9100 | 6500 | 1000 | |
| 5.0 rpm | 3720 | 3800 | 750 | |
| 10 rpm | 2600 | 2620 | 650 | |
| 20 rpm | 1870 | 1850 | 580 | |
| Zahn cup, sec | 115 | 90 | 44 | Method (ASTM D4212-88) |
| Surface Tension, dyne/cm | 25 | 26 | 34 | Method (ASTM D1331) |
| pH | 5.5 | 5.5 | 6.5 | |
| Sag, mils | 12 | 08 | <4 | Method (ASTM D4400) |
| Dry Coating Properties | | | | |
| Contact Stain | 59 | 59 | 59 | (Goodyear) Method |
| Flexibility @ Room Temp. | Pass | Pass | Pass | (Goodyear) Method |
| 13% RH | Pass | Pass | Pass | |
| 70° C. | Pass | Pass | Pass | |
| Number of scuffs @ Room Temperature | 10 | 40 | 02 | (Goodyear) Method |
| 5 Weeks RT | <05 | >30 | — | |
| High Humidity Resistance | | | | |
| 80% RH | 03 | 18 | NA | (Goodyear) Method |
| 86% RH | 03 | 16 | NA | |
| 93% RH | 02 | 09 | 02 | |

The properties of contact stain, flexibility, high humidity resistance and scuff resistance are described below.

Test Procedures

Samples for testing are prepared by taking a cured and cleaned 6"×6" (15.2 cm by 15.2 cm) white sidewall sheet. The cured sheet is placed in an oven at 60° C. for 15 minutes. The sheet is removed and the composition to be tested is drawn thereover with a draw bar to provide a 6-mil (0.152 mm) wet film. The sample is placed in an oven at 60° C. for 5 minutes. The samples are removed and cooled for 30 minutes, then 1-inch (2.54 cm) wide strips are cut for testing. The prepared coating generally has a thickness between 1.5–2.2 nil (0.038 mm–0.056 mm).

Scuff Resistance

Scuff resistance is evaluated by taking a 1.5–2.2 mil (0.038 mm–0.056 mm) dry coated strip prepared as described above and rubbing a 4"×4"×½" (10.2 cm by 10.2 cm by 1.3 cm) tread block against the coating at a 45° angle with moderate pressure. The number of strokes required to remove coating was measured. This was the point at which holes developed in the coating.

Coatings that can withstand at least about 20 strokes immediately after drying, while tested at room temperature, passed the scuff resistance test. Preferred coatings can withstand at least about 30 strokes, and the most preferred coating can withstand at least about 40 strokes. Furthermore, coatings which can withstand at least about 20 strokes after aging for one week at room temperature passed the scuff resistance test.

Contact Stain

Contact staining is evaluated by using a 1.5–2.2 mil (0.038 mm–0.056 mm) dry coated strip having the dimensions 1"×6" (2.54 cm by 15.2 cm). A 1"×1" (2.54 cm by 2.54 cm) black sidewall strip is placed on the coated strip and 1-pound (0.45 kg) weight is placed thereover. The 1"×1" (2.54 cm by 2.54 cm) section of coated strip and uncooked strip is placed in an oven at 70° C. for 24 hours. The exposed samples are removed from the oven and washed with water and dried at room temperature. All samples are exposed to UW light for 2 hours in Canadian Stain tester. The reflectance is determined for the coated white sidewall sample exposed to black sidewall, uncooked white sidewall sample (control) exposed to heat/UV. A good barrier paint maintains 90 percent of its original reflectance value.

Flexibility

Flexibility was measured using two 1.5–2.2 mil (0.038 mm–0.056 mm) dry coated strips having the dimensions 1"×6" (2.54 cm by 15.2 cm). One strip was kept at room temperature. The sample was bent 180 degrees with the coated side out around a ¼" (6.3 mm) pencil. The sample was inspected for cracking. The other strip is placed in a desiccator at 13 percent relative humidity for 24 hours. The sample is then immediately removed from the desiccator and bent immediately, then inspected for cracking. The results are then recorded.

High Humidity Resistance

The high humidity resistance was determined by taking a 1.5–2.2 mil (0.038 mm–0.056 mm) dry coated strip, placing the sample in oven at 86° F. (30° C.) and 92 percent relative humidity for 2 hours. The sample was then removed and immediately rub-tested with a 4"×4"×½" (10.2 cm by 10.2 cm by 1.3 cm) tread block. The number of strokes required to remove coating was measured.

Example 3

Aqueous PVA/PVAC-based compositions were prepared including various silicone emulsions and tested for scuff resistance. The compositions were prepared according to the procedure described in Example 1, and the following samples of silicone emulsions were manufactured from General Electric Company (and were obtained from Harwick Chemicals, Akron) and evaluated for their effectiveness as anti-scuff agents.

TABLE 4

| Tradename | Chemical | Centistokes | Functionality |
|---|---|---|---|
| SM-2061 | Polydimethyl siloxane | 60,000 | NA |
| SM-2140 | Polydimethyl siloxane | 10,000 | NA |
| SM-2163 | Polydimethyl siloxane | 350 | NA |
| SM-2164 | Polydimethyl siloxane | 100 | NA |
| SM-2068A | Polydiethyl siloxane | 100,000 | NA |
| SM-2059 | Amino Polydimethyl Siloxane | NA | Amino |
| SM-2154 | Hydroxy Polydimeyhyl Siloxane | NA | Hydroxy |

The silicone emulsions identified in Table 5 were added during mixing of the composition. The resulting coating was tested for scuff resistance according to the above described procedure after drying, after aging for 2 hours, after aging for 7 days at room temperature, and after aging for 1 day at 60° C.

TABLE 5

| Components (parts by weight) | | | | | | | |
|---|---|---|---|---|---|---|---|
| PVA/PVAC (wet) | 225 | 225 | 225 | 225 | 225 | 225 | 225 |
| Blend (dry) | 115 | 115 | 115 | 115 | 115 | 115 | 115 |
| Water | 120 | 120 | 120 | 120 | 120 | 120 | 120 |
| Xanthan Gum | 0.6 | 0.6 | 0.6 | 0.6 | 0.6 | 0.6 | 0.6 |
| Blue pigment | 0.15 | 0.15 | 0.15 | 0.15 | 0.15 | 0.15 | 0.15 |
| Polyphase AF | 1.7 | 1.7 | 1.7 | 1.7 | 1.7 | 1.7 | 1.7 |
| Surfactant (SURFYNOL 504) | 1.5 | 1.5 | 1.5 | 1.5 | 1.5 | 1.5 | 1.5 |
| SM-2059 55% | 13 | | | | | | |
| SM-2154 55% | | 13 | | | | | |
| SM-2140 55% | | | 13 | | | | |
| SM-2163 60% | | | | 17 | | | |
| SM-2164 50% | | | | | 14.8 | | |
| SM-2068 36% | | | | | | | 16.25 |
| Original Scuff | 03 | 04 | 06 | 20 | 25 | 40 | 14 |
| Aged 2 hours | 06 | 04 | 10 | >40 | >40 | 40 | 06 |
| Aged 7 days @ room temperature | 05 | 05 | 06 | >40 | >40 | 40 | 06 |
| Aged 1 day @ 60° C. | 03 | 05 | 05 | 36 | 33 | 25 | 06 |

Example 4

The procedure of Example 1 was repeated to provide the "aqueous composition" identified in Table 6. The indicated amounts of silicone emulsion were added, and the four compositions were tested. The test results are provided in Table 6.

TABLE 6

| Components (parts by weight) | | | | |
|---|---|---|---|---|
| aqueous composition (g) | 350 | 350 | 350 | 350 |
| SM-2140 | — | 15 | — | — |
| SM-2163 | — | — | 20 | — |
| SM-2164 | — | — | — | 17 |
| Scuff | | | | |
| Sprayed (original) | <5 | 38 | 30 | 10 |
| Aged 10 days @ RT | <5 | 38 | <15 | NA |

Example 5

The following experiments described in Table 7 were tested to evaluate the scuff resistance of coating prepared from other candidate anti-scuff. agents. In each case, the indicated agent was added to a PVA/PVAC composition containing 36 percent solids, and a 6-mil (0.152 mm) wet film was drawn over a Mylar substrate and dried prior to testing, according to the procedure identified above.

TABLE 7

Effect of Post Additives on Scuff

| Experiment | % Post Addition | Chemical Name | Trade Name | No. of Scuffs | Results |
|---|---|---|---|---|---|
| Control | 0 | PVA/PVAC BASED | NA | <5 | Fail |
| X53805 | 1 | | | | |
| 1 | 1 | Fatty amide | Kenamide W-40 | 8 | Fail |
| 2 | 2 | Fatty amide | Kenamide W-40 | 10 | Fail |
| 3 | 3 | Lecithin | Centrophase NV | 20 | Fail |
| 4 | 1 | Polyglycol ether | Genapol PN 30 | 3 | Fail |
| 5 | 1 | Lecithin | Centrophase NV | 6 | Fail |
| 6 | 1 | Lecithin | Centrophase LP250 | 3 | Fail |
| 7 | 1 | Polyglycol ether | Genapol PS | 2 | Fail |
| 8 | 1 | Polyglycol ether | Genapol B | 1 | Fail |
| 9 | 0.3 | Polyether modified dimethyl siloxane | BYK 307 | 5 | Fail |
| 10 | 1 | Amino silane | A1100 | 9 | Fail |
| 11 | 0.6 | Polyether modified dimethyl siloxane | BYK 321 | 7 | Fail |
| 12 | 0.6 | Polydimethyl siloxane | BYK 331 | 6 | Fail |
| 13 | 0.6 | Amino silicone | E-677 | 7 | Fail |
| 14 | 4 | Microcrystalline wax | Michel 124 | 5 | Fail |
| 15 | 2 | Magnesium silicate | Talc | 5 | Fail |
| 16 | 2 | Aluminum hydroxide | NA | 3 | Fail |
| 17 | 8.4 | Paraffinic/carnauba Disp. | Aquabead 525E | 5 | Fail |
| 18 | 2 | Polyethylene/PTFE Micropersion 523 Disp. | Micropersion 523 | 3 | Fail |
| and | 0.25 | | E-677 | | |
| 19 | 3.8 | Disp. PE/PTFE Micropersion 19 | Micropersion 19 | <16 | Fail |
|  | 1.1 | Amino silicone | E-677 | | |
| 20 | 1.5 | Amino silicone | E-677 | <8 | Fail |
| 21 | 3 | Amino silicone | E-677 | <8 | Fail |
| 22 | 4 | Polyether modified dimethyl siloxane | BYK 333 | <5 | Fail |
| 23 | 4 | Microcrystalline wax | Michel lube 124 | <5 | Fail |
|  | 0.15 | Polyether modified dimethyl siloxane Polydimethyl | BYK 407 | <5 | Fail |
| 24 | 4 | Microcrystalline wax | Michel lube 124 | <5 | Fail |
|  | 0.15 | Polyether modified dimethyl siloxane | BYK 333 | <5 | Fail |
| 25 | 4 | Microcrystalline wax | Michel lube 124 | <5 | Fail |
|  | 0.15 | Polyether modified dimethyl siloxane | BYK 321 | <5 | Fail |
| 26 | 8 | Polyethylene wax | Octawax | <5 | Fail |
| 27 | 2.14 | Corn oil | NA | <10 | Fail |

What is claimed is:

1. An aqueous polyvinyl alcohol/polyvinyl acetate-based composition comprising:
   (a) an aqueous mixture including polyvinyl alcohol and polyvinyl acetate, wherein the weight ratio of polyvinyl alcohol to polyvinyl acetate is provided between about 15:85 to about 40:60;
   (b) and an anti-scuff agent in an amount sufficient to provide increased scuff resistance for a coating prepared from the composition.

2. The aqueous polyvinyl alcohol/polyvinyl acetate-based composition according to claim 1, wherein the anti-scuff agent comprises a silicone emulsion.

3. The aqueous polyvinyl alcohol/polyvinyl acetate-based composition according to claim 2, wherein the silicone emulsion contains polydimethyl siloxane having a range of less than about 20,000 Centistokes.

4. The aqueous polyvinyl alcohol/polyvinyl acetate-based composition according to claim 1, wherein the aqueous mixture further comprises about 0.5 to about 5 percent by weight plasticizer based on the solids weight.

5. The aqueous polyvinyl alcohol/polyvinyl acetate-based composition according to claim 1, wherein the aqueous mixture has a solids content in the range of about 20 to about 50 percent by weight.

6. The aqueous polyvinyl alcohol/polyvinyl acetate-based composition according to claim 1, wherein the aqueous mixture includes greater than about 65 percent by weight, based on solids weight, of polyvinyl acetate.

7. The aqueous polyvinyl alcohol/polyvinyl acetate-based composition according to claim 1, wherein the aqueous mixture includes greater than about 15 percent by weight, based on solids weight, of polyvinyl alcohol.

8. The aqueous polyvinyl alcohol/polyvinyl acetate-based composition according to claim 1, wherein the anti-scuff agent is provided as a silicone emulsion in an amount of between about 2 to about 6 percent by weight based on the total weight of the aqueous mixture.

9. The aqueous polyvinyl alcohol/polyvinyl acetate-based composition according to claim 1, wherein the aqueous mixture further comprises a component selected from the group consisting of biocides, pigments, surfactants, thickening agents and mixtures thereof.

10. The aqueous polyvinyl alcohol/polyvinyl acetate-based composition according to claim 1, wherein the aqueous mixture has a pH in the range of from about 5 to about 8.

* * * * *